(12) United States Patent
Wei et al.

(10) Patent No.: US 11,221,158 B2
(45) Date of Patent: Jan. 11, 2022

(54) CONTROL METHOD FOR AIR CONDITIONING SYSTEM, AND AIR CONDITIONING SYSTEM

(71) Applicant: SANHUA (HANGZHOU) MICRO CHANNEL HEAT EXCHANGER CO., LTD., Zhejiang (CN)

(72) Inventors: Guangfei Wei, Zhejiang (CN); Qiang Gao, Zhejiang (CN)

(73) Assignee: SANHUA (HANGZHOU) MICRO CHANNEL HEAT EXCHANGER CO., LTD., Zhejiang (CN)

( * ) Notice: Subject to any disclaimer, the term of this patent is extended or adjusted under 35 U.S.C. 154(b) by 100 days.

(21) Appl. No.: 16/680,903

(22) Filed: Nov. 12, 2019

(65) Prior Publication Data
US 2020/0149772 A1 May 14, 2020

(30) Foreign Application Priority Data

Nov. 12, 2018 (CN) .......................... 201811338507.2

(51) Int. Cl.
*F25B 49/02* (2006.01)
*F24F 11/61* (2018.01)
(Continued)

(52) U.S. Cl.
CPC .............. *F24F 11/61* (2018.01); *F24F 11/41* (2018.01); *F24F 11/86* (2018.01); *F25B 13/00* (2013.01); *F25B 47/006* (2013.01); *F25B 49/02* (2013.01); *F25B 49/022* (2013.01); *F24F 2140/00* (2018.01); *F25B 2500/26* (2013.01); *F25B 2600/01* (2013.01); *F25B 2600/0253* (2013.01); *F25B 2600/2513* (2013.01); *Y02B 30/70* (2013.01)

(58) Field of Classification Search
CPC .. F24F 11/41; F24F 11/61; F24F 11/86; F24F 2140/00; F25B 49/02; F25B 2500/26
See application file for complete search history.

(56) References Cited

U.S. PATENT DOCUMENTS

2014/0053587 A1 2/2014 Arii

FOREIGN PATENT DOCUMENTS

| CN | 102967022 A | 3/2013 |
|----|-------------|--------|
| CN | 104729022 A | 6/2015 |

(Continued)

OTHER PUBLICATIONS

Office Action, corresponding Japanese Application No. 2019-204138 dated Dec. 21, 2020.
(Continued)

*Primary Examiner* — Jonathan Bradford
(74) *Attorney, Agent, or Firm* — Marshall, Gerstein & Borun LLP

(57) ABSTRACT

The present disclosure discloses a control method for an air conditioning system. The air conditioning system at least includes a compressor, a heat exchanger and a throttle device. The operation phase of the air conditioning system at least includes a start-up phase and a stable phase. The control method includes an action that in the start-up phase, the operating time of the compressor is set as t, when t is greater than 0 and less than 60s, an operating frequency F of the compressor is controlled to be less than 75 Hz, and a frequency rise speed per second $V_f$ of the compressor is controlled to be less than 1.25 Hz/s.

19 Claims, 2 Drawing Sheets

(51) Int. Cl.
 *F24F 11/41* (2018.01)
 *F24F 11/86* (2018.01)
 *F25B 47/00* (2006.01)
 *F25B 13/00* (2006.01)
 *F24F 140/00* (2018.01)

(56) References Cited

FOREIGN PATENT DOCUMENTS

| | | |
|---|---|---|
| CN | 107726556 A | 2/2018 |
| JP | S6298168 A | 5/1987 |
| JP | H0268461 A | 3/1990 |
| JP | H0787786 A | 3/1995 |
| JP | 2012007884 A | 1/2012 |
| JP | 2012072962 A | 4/2012 |
| JP | 2014190649 A | 10/2014 |
| JP | 2018112378 A | 7/2018 |
| WO | WO-2008016227 A1 | 2/2008 |

OTHER PUBLICATIONS

Office Action, corresponding Chinese Application No. 201811338507.2 dated Oct. 23, 2020.
Extended European Search Report for Application No. EP 19208449.9, dated Mar. 11, 2020.
Office Action, corresponding Japanese Application No. 2019-204138 dated Aug. 31, 2021.

CONTROL METHOD FOR AIR CONDITIONING SYSTEM, AND AIR CONDITIONING SYSTEM

CROSS-REFERENCE TO RELATED APPLICATION

This application claims priority to and benefits of Chinese Patent Application Serial No. 201811338507.2, filed with the China National Intellectual Property Administration on Nov. 12, 2018, the entire content of which is incorporated herein by reference.

FIELD

The present disclosure relates to the technical field of air conditioning systems, in particular to a control method for an air conditioning system and an air conditioning system.

BACKGROUND

In the currently used air conditioning system, when a heat exchanger in the system includes a multi-channel heat exchanger, the heat exchange performance of the multi-channel heat exchanger is poor at the start-up phase of the compressor, the heat exchanger is easily frosted during heating operation, which accelerates attenuation of the system capability during the heating operation.

SUMMARY

Embodiments of the present disclosure provide a control method for an air conditioning system. The air conditioning system at least includes a compressor and a multi-channel heat exchanger, and the control method includes an action that in a start-up phase of the air conditioning system, an operating time of the compressor is t, when t is less than 60 s, an operating frequency F of the compressor is controlled to be less than 75 Hz, and a frequency rise speed per second $V_f$ of the compressor is controlled to be less than 1.25 Hz/s.

Embodiments of the present disclosure further provide another control method for an air conditioning system. The air conditioning system at least includes a compressor, a multi-channel heat exchanger, and a thermal expansion valve, and the control method comprises an action that in a start-up phase of the air conditioning system, an operating time of the compressor is t, when the operating time t of the compressor is less than 60 seconds, the operating frequency F of the compressor is controlled to be less than 60 Hz, and the frequency rise speed per second $V_f$ of the compressor is controlled to be less than 1 Hz/s.

Embodiments of the present disclosure further provide an air conditioning system. The air conditioning system includes a compressor and a multi-channel heat exchanger. The air conditioning system at least includes a start-up phase and a stable phase, in a start-up phase of the air conditioning system, an operating time of the compressor is t, when t is less than 60 s, an operating frequency F of the compressor is controlled to be less than 75 Hz, and a frequency rise speed per second $V_f$ of the compressor is controlled to be less than 1.25 Hz/s.

BRIEF DESCRIPTION OF THE DRAWINGS

The above and/or additional aspects and advantages of the present disclosure will become apparent and readily understood from the description of the embodiments taken in conjunction with the following drawings, in which.

Figure 1:
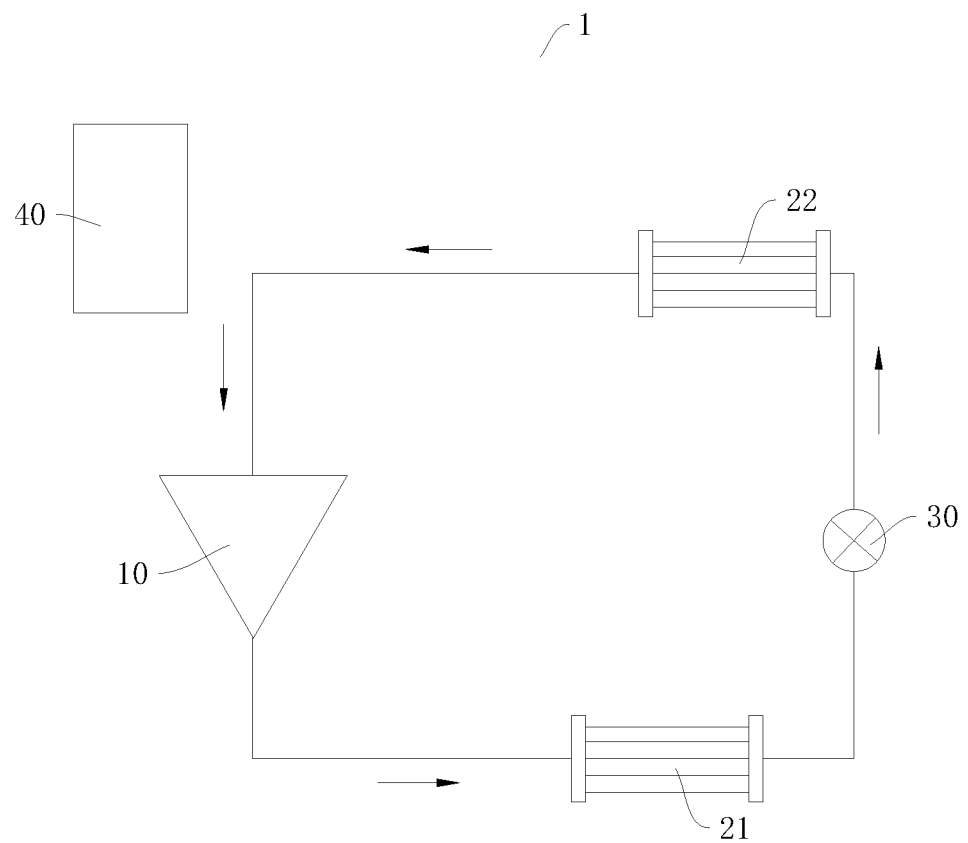
FIG. 1 is a schematic structural view of an air conditioning system according to an embodiment of the present disclosure.

Reference numerals: air conditioning system 1, compressor 10, outdoor heat exchanger 21, indoor heat exchanger 22, throttle device 30, controller 40, four-way valve 50.

DETAILED DESCRIPTION

This application is based on the inventor's discovery and understanding of the following facts and problems:

In the related art, compared with a copper tube fin heat exchanger, a multi-channel heat exchanger has a smaller internal volume and more serious suction phenomenon, which is easy to frost in the start-up process of an air conditioning system.

Hereinafter, embodiments of the present disclosure will be described in detail, examples of which are illustrated in the accompanying drawings, wherein the same or similar reference numerals refer to the same or similar elements or elements having the same or similar functions throughout. The embodiments described below with reference to the accompanying drawings are exemplary and are only for the purpose of explaining the present disclosure and should not be construed as limiting the present disclosure.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like indicate the orientation or positional relationship based on the orientation or positional relationship shown in the drawings. It is only for the convenience of describing the present disclosure and simplifying the description, and is not intended to indicate or imply that the referred devices or elements must have a specific orientation, be constructed and operate in a specific orientation, and thus cannot be understood as a limitation of the present disclosure. In addition, features defined by "first" and "second" may explicitly or implicitly include one or more of the features. In the description of the present disclosure, unless otherwise specified, the term "plurality of" means two or more than two.

In the description of the present disclosure, it should be noted that the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Embodiments of the present disclosure provide a control method for an air conditioning system. The air conditioning system at least includes a compressor and a multi-channel heat exchanger, and the control method includes an action that in a start-up phase of the air conditioning system, an operating time of the compressor is t, when t is less than 60 s, an operating frequency F of the compressor is controlled to be less than 75 Hz, and a frequency rise speed per second $V_f$ of the compressor is controlled to be less than 1.25 Hz/s.

Embodiments of the present disclosure further provide another control method for an air conditioning system. The air conditioning system at least includes a compressor, a multi-channel heat exchanger, and a thermal expansion valve, and the control method comprises an action that in a start-up phase of the air conditioning system, an operating time of the compressor is t, when the operating time t of the compressor is less than 60 seconds, the operating frequency F of the compressor is controlled to be less than 60 Hz, and the frequency rise speed per second $V_f$ of the compressor is controlled to be less than 1 Hz/s.

Embodiments of the present disclosure further provide an air conditioning system. The air conditioning system includes a compressor and a multi-channel heat exchanger. The air conditioning system at least includes a start-up phase and a stable phase, in a start-up phase of the air conditioning system, an operating time of the compressor is t, when t is less than 60 s, an operating frequency F of the compressor is controlled to be less than 75 Hz, and a frequency rise speed per second $V_f$ of the compressor is controlled to be less than 1.25 Hz/s.

A control method for an air conditioning system 1 according to an embodiment of the present disclosure will be described with reference to the accompanying drawings.

Figure 2:
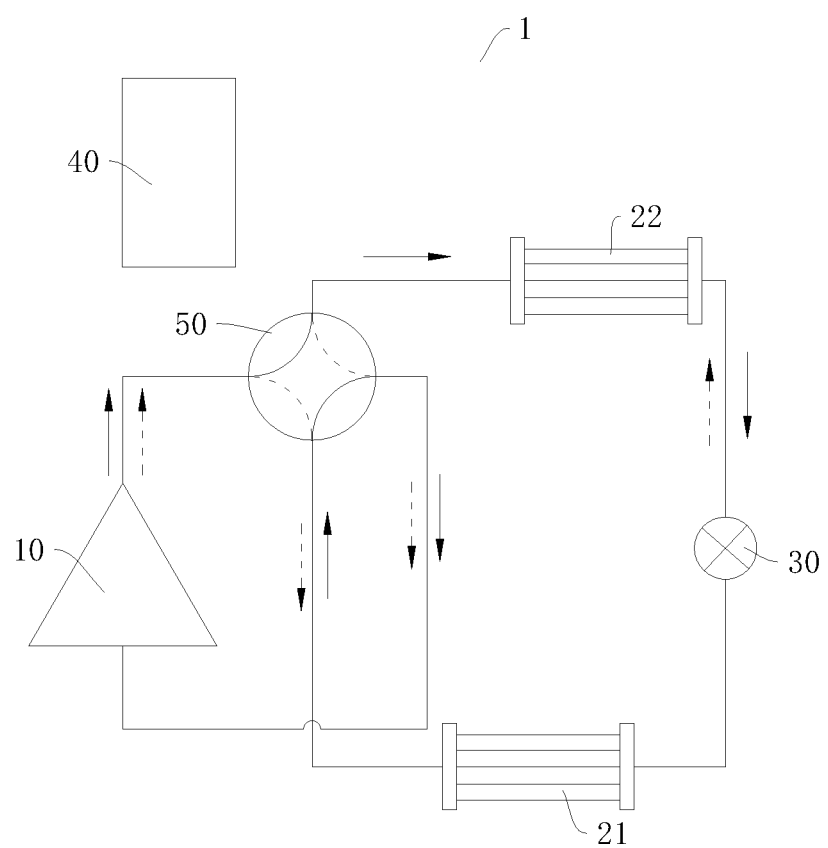
FIG. 2 is a schematic structural view of an air conditioning system according to another embodiment of the present disclosure.

As shown in FIGS. 1 and 2, the air conditioning system 1 according to an embodiment of the present disclosure at least includes a compressor 10 and a multi-channel heat exchanger. An operation phase of the air conditioning system 1 at least includes a start-up phase and a stable phase. The control method includes actions as follows.

In the start-up phase, the operating time of the compressor 10 is set as t. When the operating time t of the compressor 10 is less than 60 s, the operating frequency F of the compressor 10 is controlled to be less than 75 Hz, and the frequency rise speed per second $V_f$ of the compressor 10 is controlled to be less than 1.25 Hz/s.

It should be understood herein that the "start-up" phase refers to an operation process of the air conditioning system from a first state to a second state within a predetermined time, the compressor is shut down in the first state and stably operates in the second state. The stable operation state of the air conditioning system refers to a state in which the operating frequency of the compressor of the air conditioning system is relatively stable without continuously or step-by-step rise.

Specifically, if a shutdown occurs during the start-up process of the compressor 10, the timing is restarted, i.e., t is re-zeroed.

With the control method for the air conditioning system 1 according to the embodiment of the present disclosure, a maximum operating frequency of the compressor 10 is controlled during the start-up phase, excessive frequencies of the compressor 10 during the start-up process can be avoided, such that the start-up process of the compressor 10 is more stable and reasonable, the suction phenomenon that otherwise may occur in the compressor 10 is reduced, and frosting on the multi-channel heat exchanger can be avoided during the start-up process of the compressor 10.

In addition, by controlling the frequency rise speed per second of the compressor 10 during the start-up process, excessive frequency rise speed can be prevented during the start-up process of the compressor 10, such that the start-up process of the compressor 10 is more stable and reasonable, the possible suction in the compressor 10 can be further reduced, and frosting on the multi-channel heat exchanger can be avoided during the start-up process of the compressor 10.

Therefore, with the control method for the air conditioning system 1 according to the embodiment of the present disclosure, frosting on the multi-channel heat exchanger is slowed down at the start-up phase of the system, and the reliability of the system is improved.

An air conditioning system 1 according to a specific embodiment of the present disclosure will be described below with reference to the accompanying drawings.

In some specific embodiments of the present disclosure, as shown in FIGS. 1 and 2, the air conditioning system 1 according to the embodiment of the present disclosure at least includes a compressor 10, a multi-channel heat exchanger, and a throttle device 30.

Specifically, when the operating time t of the compressor 10 is less than 180 s and greater than or equal to 60 s, the frequency rise speed per second $V_f$ of the compressor 10 is controlled to be less than 1.5 Hz/s. This can further limit the frequency rise speed of the compressor 10 after a period of operation in the start-up phase, and further improve the stability and reliability of the compressor 10 during the start-up process.

More specifically, when the operating time t of the compressor 10 is less than 300 s and greater than or equal to 180 s, the frequency rise speed per second $V_f$ of the compressor 10 is controlled to be less than 1.75 Hz/s. This can further limit the frequency rise speed of the compressor 10 after a period of operation in the start-up phase, and further improve the stability and reliability of the compressor 10 during the start-up process. Therefore, the frequency of the compressor 10 can be controlled in the whole start-up process, such that the frequency change in the start-up process of the compressor 10 is more reasonable.

In a specific embodiment of the present disclosure, the throttle device 30 is a thermal expansion valve. When the operating time t of the compressor 10 is less than 60 s, the operating frequency F of the compressor 10 is controlled to be less than 60 Hz, and the frequency rise speed per second $V_f$ of the compressor 10 is controlled to be less than 1 Hz/s. Since the thermal expansion valve is automatically adjusted, the opening degree of the thermal expansion valve cannot be accurately controlled, and the adjusting speed of the thermal expansion valve is relatively slow. By accurately limiting the operating frequency of the compressor, the risk of frosting can be effectively controlled for the air conditioning system 1.

Furthermore, when the operating time t of the compressor 10 is less than 30 s, the operating frequency F of the compressor 10 is controlled to be less than 30 Hz, and the frequency rise speed per second $V_f$ of the compressor 10 is controlled to be less than 1 Hz/s. In this way, the frequency change of the compressor 10 can be more accurately limited, and the reliability of the air conditioning system 1 can be further improved.

Furthermore, when the operating time t of the compressor is less than 30 s, the operating frequency F of the compressor 10 is controlled to be less than 20 Hz, and the frequency rise speed per second $V_f$ of the compressor 10 is controlled to be less than 0.75 Hz/s. In this way, the frequency change of the compressor 10 can be more accurately limited, thereby further improving the stability and reliability of the air conditioning system 1 and avoiding frosting.

Specifically, when the operating time t of the compressor 10 is less than 180 s and greater than or equal to 60 s, the frequency rise speed per second $V_f$ of the compressor 10 is controlled to be less than 1.25 Hz/s; When the operating time t of the compressor 10 is less than 300 s and greater than or equal to 180 s, the frequency rise speed per second $V_f$ of the compressor 10 is controlled to be less than 1.5 Hz/s. In this way, the frequency changing trend in different time periods in the whole start-up phase can be limited, such that in different time periods excessive frequency of the compressor 10 can be prevented while sufficient start-up frequency can be provided to ensure the start-up efficiency of the compressor 10.

In another specific embodiment of the present disclosure, the throttle device 30 is an electronic expansion valve, in other words, the air conditioning system includes an electronic expansion valve. The instantaneous opening degree of the electronic expansion valve is set as P, and the maximum opening degree of the electronic expansion valve is set as $P_{max}$. When the operating time t of the compressor 10 is less than 30 s, a ratio of the frequency rise speed per second $V_f$ of the compressor 10 to the instantaneous opening degree of the electronic expansion valve P is controlled to be less than or equal to $7/P_{max}$. When the operating time of the compressor 10 is less than 180 s and greater than or equal to 60 s, a ratio of the frequency rise speed per second $V_f$ of the compressor 10 to the instantaneous opening degree of the electronic expansion valve is set as P is controlled to be less than or equal to $3.5/P_{max}$. In this way, the risk of frosting can be reduced by controlling the frequency of the compressor 10 and the frequency rise speed, and the ability of the air conditioning system 1 to stably heat can be improved, while the refrigerant charge of the air conditioning system 1 can be optimized and reduced.

Specifically, when the operating time t of the compressor 10 is less than 30 s, the instantaneous opening degree P of the electronic expansion valve is greater than or equal to $0.25\ P_{max}$. When the operating time t of the compressor 10 is less than 60 s and greater than or equal to 30 s, the instantaneous opening degree P of the electronic expansion valve is greater than or equal to $0.15\ P_{max}$. When the operating time t of the compressor 10 is less than 180 s and greater than or equal to 60 s, the instantaneous opening P of the electronic expansion valve is greater than or equal to $0.125\ P_{max}$. When the operating time t of the compressor 10 is less than 300 s and greater than or equal to 180 s, the instantaneous opening degree P of the electronic expansion valve is greater than or equal to $0.1\ P_{max}$. In this way, the changing trend of the opening degree in different periods within 300 seconds in the start-up phase can be controlled, thus further reducing the risk of frosting, improving the stability, and reducing the refrigerant charge.

FIG. 2 shows an air conditioning system 1 according to a specific embodiment of the present disclosure. As shown in FIG. 2, the air conditioning system 1 further includes a switching device, and the switching device is a four-way valve 50. The multi-channel heat exchanger includes an outdoor heat exchanger 21 and an indoor heat exchanger 22. The throttle device 30 is connected between the outdoor heat exchanger 21 and the indoor heat exchanger 22. The outdoor heat exchanger 21, the indoor heat exchanger 22, and the compressor 10 are separately connected to the four-way valve 50. The four-way valve 50 is switchable between a cooling state and a heating state. In the cooling state, the four-way valve 50 communicates an inlet of the compressor 10 with the outdoor heat exchanger 21 and communicates an outlet of the compressor 10 with the indoor heat exchanger 22. In the heating state, the four-way valve 50 communicates the inlet of the compressor 10 with the indoor heat exchanger 22 and communicates the outlet of the compressor 10 with the outdoor heat exchanger 21. In this way, the air conditioning system 1 can be switched between cooling and heating functions.

FIG. 1 shows an air conditioning system 1 according to another specific embodiment of the present disclosure. As shown in FIG. 1, the heat exchanger of the air conditioning system 1 includes an indoor heat exchanger 22 and an outdoor heat exchanger 21, an outlet of the indoor heat exchanger 22 is connected to an inlet of the compressor 10, an outlet of the compressor 10 is connected to an inlet of the outdoor heat exchanger 21, an outlet of the outdoor heat exchanger 21 is connected to an inlet of the throttle device 30, and an outlet of the throttle device 30 is connected to an inlet of the indoor heat exchanger 22. In this way, the heating efficiency of the air conditioning system 1 is ensured and frosting can be prevented.

Other configurations and operations of the control method for the air conditioning system 1 according to embodiments of the present disclosure are known to those of ordinary skill in the art and will not be described in detail herein.

Reference throughout this specification to "an embodiment," "some embodiments," "exemplary embodiment", "a specific example," or "some examples," means that a particular feature, structure, material, or characteristic described in connection with the embodiment or example is included in at least an embodiment or example of the present disclosure. Thus, the appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A control method for an air conditioning system, wherein the air conditioning system at least comprises a compressor and a multi-channel heat exchanger, and the control method comprises an action that in a start-up phase of the air conditioning system, an operating time of the compressor is t, when t is less than 60 s, an operating frequency F of the compressor is controlled to be less than 75 Hz, and a frequency rise speed per second $V_f$ of the compressor is controlled to be less than 1.25 Hz/s;

wherein when the operating time t of the compressor is less than 30 s, the operating frequency F of the compressor is controlled to be less than 30 Hz, and the frequency rise speed per second $V_f$ of the compressor is controlled to be less than 1 Hz/s.

2. The control method according to claim 1, wherein when the operating time t of the compressor is less than 180 s and greater than or equal to 60 s, the frequency rise speed per second $V_f$ of the compressor is controlled to be less than 1.5 Hz/s.

3. The control method according to claim 1, wherein when the operating time t of the compressor is less than 300 s and greater than or equal to 180 s, the frequency rise speed per second $V_f$ of the compressor is controlled to be less than 1.75 Hz/s.

4. The control method according to claim 1, wherein the air conditioning system comprises a thermal expansion valve, and when the operating time t of the compressor is less than 60 seconds, the operating frequency F of the compressor is controlled to be less than 60 Hz, and the frequency rise speed per second $V_f$ of the compressor is controlled to be less than 1 Hz/s.

5. The control method according to claim 4, wherein when the operating time t of the compressor is less than 30 s, the operating frequency F of the compressor is controlled to be less than 20 Hz, and the frequency rise speed per second $V_f$ of the compressor is controlled to be less than 0.75 Hz/s.

6. The control method according to claim 4, wherein when the operating time t of the compressor is less than 180 s and greater than or equal to 60 s, the frequency rise speed per second $V_f$ of the compressor is controlled to be less than 1.25 Hz/s, when the operating time t of the compressor is less than 300 s and greater than or equal to 180 s, the frequency rise speed per second $V_f$ of the compressor is controlled to be less than 1.5 Hz/s.

7. The control method according to claim 1, wherein the air conditioning system comprises an electronic expansion valve, an instantaneous opening degree of the electronic expansion valve is set as P, a maximum opening degree of the electronic expansion valve is $P_{max}$, and when the operating time t of the compressor is less than 30 s, the instantaneous opening degree P of the electronic expansion valve is greater than or equal to $0.25P_{max}$.

8. The control method according to claim 7, wherein when the operating time t of the compressor is less than 30 s, a value of a ratio of the frequency rise speed per second $V_f$ of the compressor to the instantaneous opening degree P of the electronic expansion valve is controlled to be less than or equal to $7/P_{max}$.

9. The control method according to claim 7, wherein when the operating time of the compressor is less than 180 s and greater than or equal to 60 s, a value of a ratio of the frequency rise speed per second $V_f$ of the compressor to the instantaneous opening degree P of the electronic expansion valve is controlled to be less than or equal to $3.5/P_{max}$.

10. The control method according to claim 7, wherein,
when the operating time t of the compressor is less than 60 s and greater than or equal to 30 s, the instantaneous opening degree P of the electronic expansion valve is greater than or equal to $0.15P_{max}$;
when the operating time t of the compressor is less than 180 s and greater than or equal to 60 s, the instantaneous opening degree P of the electronic expansion valve is greater than or equal to $0.125P_{max}$;
when the operating time t of the compressor is less than 300 s and greater than or equal to 180 s, the instantaneous opening degree P of the electronic expansion valve is greater than or equal to $0.1P_{max}$.

11. The control method according to claim 1, wherein the air conditioning system further comprises a switching device, and the switching device is a four-way valve.

12. A control method for an air conditioning system, wherein the air conditioning system at least comprises a compressor, a multi-channel heat exchanger, and a thermal expansion valve, and the control method comprises an action that in a start-up phase of the air conditioning system, an operating time of the compressor is t, when the operating time t of the compressor is less than 60 seconds, the operating frequency F of the compressor is controlled to be less than 60 Hz, and the frequency rise speed per second $V_f$ of the compressor is controlled to be less than 1 Hz/s.

13. The control method according to claim 12, wherein when the operating time t of the compressor is less than 30 s, the operating frequency F of the compressor is controlled to be less than 20 Hz, and the frequency rise speed per second $V_f$ of the compressor is controlled to be less than 0.75 Hz/s.

14. The control method according to claim 12, wherein when the operating time t of the compressor is less than 180 s and greater than or equal to 60 s, the frequency rise speed per second $V_f$ of the compressor is controlled to be less than 1.25 Hz/s, when the operating time t of the compressor is less than 300 s and greater than or equal to 180 s, the frequency rise speed per second $V_f$ of the compressor is controlled to be less than 1.5 Hz/s.

15. The control method according to claim 12, wherein the air conditioning system further comprises a switching device, and the switching device is a four-way valve.

16. An air conditioning system, comprising a compressor, a multi-channel heat exchanging assembly, and a controller wherein the air conditioning system is configured for a start-up phase and a stable phase, and wherein the controller is configured to operate the system such that in a start-up phase of the air conditioning system, an operating time of the compressor is t, when t is less than 60 s, an operating frequency F of the compressor is controlled to be less than 75 Hz, and a frequency rise speed per second $V_f$ of the compressor is controlled to be less than 1.25 Hz/s;
wherein when the operating time t of the compressor is less than 30 s, the operating frequency F of the compressor is controlled to be less than 30 Hz, and the frequency rise speed per second $V_f$ of the compressor is controlled to be less than 1 Hz/s.

17. The air conditioning system according to claim 16, wherein when the operating time t of the compressor is less than 180 s and greater than or equal to 60 s, the frequency rise speed per second $V_f$ of the compressor is controlled to be less than 1.5 Hz/s.

18. The air conditioning system according to claim 17, wherein when the operating time t of the compressor is less than 300 s and greater than or equal to 180 s, the frequency rise speed per second $V_f$ of the compressor is controlled to be less than 1.75 Hz/s.

19. The air conditioning system according to claim 16, wherein the multi-channel heat exchanging assembly further comprises an outdoor heat exchanger, an indoor heat exchanger, a throttle device connected between the outdoor heat exchanger and the indoor heat exchanger, and a four-way valve.

* * * * *